United States Patent
Watanabe et al.

(10) Patent No.: US 8,386,780 B2
(45) Date of Patent: Feb. 26, 2013

(54) CRYPTOGRAPHIC COMMUNICATION SYSTEM, TERMINAL DEVICE, SERVER, AND DECRYPTION METHOD

(75) Inventors: Yuji Watanabe, Tokyo-to (JP); Masayuki Numao, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 3252 days.

(21) Appl. No.: 10/453,015

(22) Filed: Jun. 3, 2003

(65) Prior Publication Data

US 2004/0025019 A1 Feb. 5, 2004

(30) Foreign Application Priority Data

Jun. 4, 2002 (JP) ................................ 2002-163510

(51) Int. Cl.
*H04L 29/06* (2006.01)
(52) U.S. Cl. ........................................................ 713/168
(58) Field of Classification Search .................. None
See application file for complete search history.

(56) References Cited

U.S. PATENT DOCUMENTS

| | | | | |
|---|---|---|---|---|
| 4,924,515 A * | 5/1990 | Matyas et al. | ............... | 380/280 |
| 6,859,533 B1 * | 2/2005 | Wang et al. | ............... | 380/28 |
| 6,988,199 B2 * | 1/2006 | Toh et al. | ............... | 713/170 |
| 2002/0147917 A1 * | 10/2002 | Brickell | ............... | 713/193 |
| 2003/0142364 A1 * | 7/2003 | Goldstone | ............... | 358/402 |
| 2003/0182559 A1 * | 9/2003 | Curry et al. | ............... | 713/189 |

FOREIGN PATENT DOCUMENTS

| | | |
|---|---|---|
| JP | 11-027254 | 1/1999 |
| JP | 2001-202010 | 7/2001 |
| JP | 2001-209306 | 8/2001 |
| JP | 2002-287632 | 10/2002 |
| JP | 2002-300145 | 10/2002 |

OTHER PUBLICATIONS

Menezes et al. Handbook of Applied Cryptography 1997 CRC Press pp. 524-528.*

* cited by examiner

*Primary Examiner* — David Pearson
(74) *Attorney, Agent, or Firm* — Ido Tuchman; William J. Stock

(57) ABSTRACT

Cryptographic communication system including a sender terminal for encrypting and transmitting a message, a recipient terminal for receiving and decrypting the encrypted message, an agent terminal for decrypting the message in place of the recipient terminal, and a conversion server for supporting the agent terminal to decrypt the message. The sender terminal encrypts the message using a public key of the recipient terminal. Using a public key of the conversion server, a predetermined restricted condition, and a secret key for decryption of the message, the recipient terminal generates a delegation key allowing decryption of the message under the restricted condition and passes the delegation key to the agent terminal. The conversion server validates a power of the agent terminal to decrypt the message based on the information contained in the delegation key from the agent terminal. The agent terminal then decrypts the message with validation of the conversion server.

11 Claims, 12 Drawing Sheets

CRYPTOGRAPHIC COMMUNICATION SYSTEM, TERMINAL DEVICE, SERVER, AND DECRYPTION METHOD

FIELD OF THE INVENTION

The present invention is directed to cryptographic technology delegating the power to decrypt an encrypted message. It is more specifically directed to cryptographic technology delegating the power to decrypt an encrypted message under a restricted condition such as time limitation.

BACKGROUND OF THE INVENTION

In communication using a public key cryptosystem, a sender of a message encrypts the message using a public key of a recipient and then transmits the encrypted message. Only the recipient having a secret key corresponding to the public key can decrypt the cipher text (hereinafter, the term "recipient" indicates a member holding a secret key (decryption key) corresponding to a cipher text).

Here, consideration will be made of a situation where the recipient cannot perform decryption processing using the secret key, such as a case in which the recipient is not connected to a network. In such a situation, there are many cases where it is not desirable that processing is interrupted because of the disconnected state of a particular recipient in continuous processing that a plurality of hosts are related to, or the like. In such a case, a technique is desired where, before being disconnected, the recipient can delegate its own decryption power to an agent specified by the recipient in order to avoid the interruption of the processing. In a case that decryption processing by a particular recipient is required and the recipient is in the disconnected state, execution of the decryption processing is requested for an agent previously specified, thus making it possible to avoid the interruption of the continuous processing.

There have been many studies on the delegation of the power by reflecting a practical importance. However, most of the studies are concerned with delegation of credentials. There are few studies on delegation of the decryption power called "proxy cryptosystem". As the conventional technology of this type, for example, technologies described in the following references are conceived.

Reference 1: Mambo, M and Okamoto, E., "Proxy Cryptosystems: Delegation of the Power to Decrypt Ciphertexts," IEICE Trans. Fund. Electronics Communications and Comp. Sci. E80-A/1. pp. 54-63, 1997.

Reference 2: Blaze, M., Bleumer, G. and Strauss, M., "Divertible Protocols and Atomic Proxy Cryptography," Proc. of EUROCRYPT '98, LNCS, 1998.

Reference 3: Jakobsson, M., "On Quorum Controlled Asymmetric Proxy Re-encryption," Proc. of PKC '99, LNCS, 1999.

A reason for fewer studies on the delegation of decryption power, is the difficulty of limited delegation of the decryption power conceived. If the decryption power is delegated permanently with no limitation, it is sufficient to give information of the secret key held by the recipient to the agent. However, permanent delegation of the power is not necessary in the situation described above, and the power is delegated while the condition for exercising the power is limited. For example, the decryption power is set to be valid at a start time and set to be invalid at a finish time. Such delegation of the power is a very difficult problem in terms of cryptology.

The conventional arts described in References 1-3, propose methods of converting a cipher text so as to allow the agent to decrypt the cipher text. However, none of the references deal with delegation of the decryption power for a limited period.

In a peer to peer (P2P) network expected to be widely used in the future, hosts (peers) frequently withdraw from the network or (re)join the network unlike a conventional statically structured network. On the other hand, in order to provide a security service consistent throughout the entire P2P network (access to encrypted data, for example), a situation requiring a decryption key of the peer in the disconnected state can frequently occur. Therefore, if the power to use the decryption key can be delegated to another peer under a certain restricted condition, the peer with the power delegated can continue the decryption processing even when the predetermined peer is in the disconnected state. Accordingly, a very flexible security service can be constructed.

SUMMARY OF THE INVENTION

It is therefor an aspect of the present invention to realize cryptographic communication where a power to decrypt a cipher text can be easily delegated under a certain restriction.

In an example embodiment, the present invention achieves the above described aspects is realized as a cryptographic communication system constituted as follows. Specifically, the cryptographic communication system includes a sender terminal for encrypting and transmitting a message; a recipient terminal for receiving and decrypting the encrypted message; an agent terminal for decrypting the message in place of the recipient terminal; and a conversion server for supporting the agent terminal to decrypt the message. Here, the sender terminal encrypts the message using a public key of the recipient terminal. Using a public key of the conversion server, a predetermined restricted condition, and a secret key for decryption of the message, the recipient terminal generates a delegation key allowing decryption of the message under the restricted condition and passes the generated delegation key to the agent terminal. The conversion server acquires at least part of the delegation key from the agent terminal and validates a power of the agent terminal to decrypt the message based on acquired information. The agent terminal decrypts the message with validation of the conversion server.

In some embodiments, the agent terminal can decrypt the message by proxy on condition that validation of the conversion server has been passed through.

Furthermore, the present invention is realized as a program for implementing the recipient terminal, the receiver terminal, and the conversion server by computers. The program can be provided by storing the program in a storage medium such as a magnetic disk, an optical disk, and a semiconductor memory for distribution or distributing the program via a network.

Still furthermore, another present invention achieving the above described aspects is realized as a decryption method for decrypting an encrypted message as follows. Specifically, the decryption method includes the steps of: generating a delegation key based on a first secret key corresponding to a first public key, a predetermined restricted condition, and a second public key, the delegation key allowing decryption of the message under the restricted condition; passing at least part of the delegation key to an external party having a second secret key corresponding to the second public key and acquiring from the external party a result of judgment whether or not decryption processing with the delegation key satisfies the restricted condition; and decrypting the message, which is encrypted with the first public key, by use of the delegation key and the result of judgment of the external party.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENT

Figure 1:
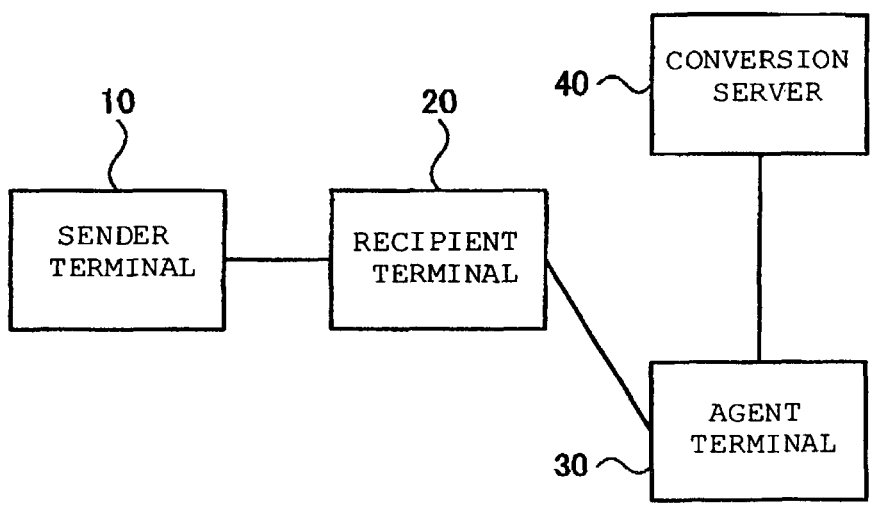
FIG. 1 is a diagram schematically showing an example of a cryptographic communication system implementing a delegation method of a decryption power according to an embodiment.

The present invention provides methods, systems and apparatus to realize cryptographic communication where a power to decrypt a cipher text can be easily delegated under certain restriction. It also provides a cryptographic communication system realizing a flexible security service by use of the cryptographic communication.

An example embodiment of the present invention achieves the above described aspects as a cryptographic communication system constituted as follows. The cryptographic communication system includes a sender terminal for encrypting and transmitting a message; a recipient terminal for receiving and decrypting the encrypted message; an agent terminal for decrypting the message in place of the recipient terminal; and a conversion server for supporting the agent terminal to decrypt the message. The sender terminal encrypts the message using a public key of the recipient terminal. Using a public key of the conversion server, a predetermined restricted condition, and a secret key for decryption of the message, the recipient terminal generates a delegation key allowing decryption of the message under the restricted condition and passes the generated delegation key to the agent terminal. The conversion server acquires at least part of the delegation key from the agent terminal and validates a power of the agent terminal to decrypt the message based on acquired information. The agent terminal decrypts the message with validation of the conversion server.

As a restricted condition, for example, a time limitation specifying a start time when the power to decrypt the message becomes valid and a finish time can be set. For the generation of the delegation key, calculation using a one-way hash function is performed. In the conversion server, the validation whether or not the delegation key of the agent terminal satisfies the restricted condition is performed by calculation using the same one-way hash function.

More specifically, in an example embodiment the recipient terminal includes: secret key holding means for holding a secret key for decryption of a message encrypted using a public key of its own; and delegation key generation means for generating a delegation key based on a public key of a predetermined conversion server, a predetermined restricted condition, and the secret key held by the secret key holding means, the delegation key allowing decryption of the message under the restricted condition. The recipient terminal passes the delegation key generated by the delegation key generation means to a predetermined agent terminal for decrypting the message in place of the recipient terminal. Accordingly, the power to decrypt a message is delegated under restriction of the restricted condition.

In an example embodiment, the agent terminal device includes: delegation key holding means for holding a delegation key generated using a one-way hash function based on a public key of a predetermined conversion server, a predetermined restricted condition, and a secret key for decryption of an encrypted message, the delegation key allowing decryption of the message under the restricted condition; inquiry means for transmitting at least part of the delegation key to the conversion server and receiving from the conversion server a parameter obtained as a result of validation of the conversion server according to the restricted condition; and decryption means for decrypting the message by use of the parameter acquired from the conversion server and the delegation key.

An example embodiment of the conversion server includes: receiving means for receiving from a predetermined terminal device a predetermined restricted condition, part of a message encrypted with a first public key, and predetermined information encrypted with a second public key; judgment means for judging whether or not the acquired restricted condition is satisfied; parameter calculation means for decrypting the predetermined information with a secret key corresponding to the second public key and calculating a parameter for decryption of the message by use of the predetermined information, the restricted condition, and part of the message encrypted with the first public key; and transmitting means for transmitting to the predetermined terminal device the parameter calculated by the parameter calculation means. According to the above-described embodiment, the agent terminal can decrypt the message by proxy on condition that validation of the conversion server has been passed through.

The present invention is also realized as a program for implementing the recipient terminal, the receiver terminal, and the conversion server by computers. The program can be provided by storing the program in a storage medium such as a magnetic disk, an optical disk, and a semiconductor memory for distribution or distributing the program via a network.

Another example of a cryptographic communication system according to the present invention includes: a sender terminal for encrypting and transmitting a message; a recipient terminal for holding a secret key for decryption of the encrypted message; an agent terminal for decrypting the message in place of the recipient terminal based on the secret key of the recipient terminal; and a conversion server for validating decryption processing of the message by the agent terminal. The cryptographic communication system shares an operation of the secret key of the recipient terminal between the agent terminal and the conversion server using threshold decryption. Accordingly, the agent terminal is allowed to decrypt the message when obtaining validation from the conversion server.

Another example embodiment of the present invention achieving the above described aspects is realized as a decryption method for decrypting an encrypted message as follows. Specifically, the decryption method includes the steps of: generating a delegation key based on a first secret key corresponding to a first public key, a predetermined restricted condition, and a second public key, the delegation key allowing decryption of the message under the restricted condition; passing at least part of the delegation key to an external party having a second secret key corresponding to the second public key and acquiring from the external party a result of judgment whether or not decryption processing with the delegation key satisfies the restricted condition; and decrypting the message, which is encrypted with the first public key, by use of the delegation key and the result of judgment of the external party.

Hereinafter, the present invention will be described in detail based on an embodiment shown in the accompanying drawings. FIG. 1 is a diagram schematically explaining a constitution of a cryptographic communication system implementing a method of delegating a decryption power according to the embodiment. Referring to FIG. 1, the cryptographic communication system of the embodiment is implemented by a sender terminal 10, a recipient terminal 20, an agent terminal 30, and a conversion server 40. The sender terminal 10 is a terminal device used by a sender of a message in a cryptographic communication. The sender terminal 10 encrypts the message with a public key of a recipient and transmits the encrypted message. The recipient terminal 20 is a terminal device used by the recipient of the encrypted message. The recipient terminal 20 has a secret key $d_A$ corresponding to a public key $e_A$. The agent terminal 30 is a terminal device used by an agent of decryption processing. The conversion server 40 checks whether the agent to execute decryption processing satisfies a predetermined restricted condition. The conversion server 40 has a secret key $d_T$ corresponding to a public key $e_T$.

Each terminal device constituting the cryptographic communication system according to the embodiment is implemented by an information processing device equipped with a network function such as a work station, a personal computer, a personal digital assistants (PDA), or the like.

The conversion server 40 is implemented by a computer device equipped with a network function such as a work station, a personal computer, or the like. These devices exchange messages via a not-shown network. The network may be composed of either wired communication lines or wireless communication lines.

FIG. 1 shows one device for each component for simplification. However, in an actual operation, messages can be exchanged between a plurality of sender terminals 10 and a plurality of recipient terminals 20. Furthermore, a plurality of conversion servers 40 can be provided as described later. The names of the sender terminal 10, the recipient terminal 20, and the agent terminal 30 are based on the positions of the sender and the recipient in a communication of the predetermined message. Accordingly, the same terminal device functions as the sender terminal 10, the recipient terminal 20, or the agent terminal 30 depending on a communication mode.

When the terminal device operates as the sender terminal 10, a program-controlled CPU functions as encryption means for encrypting the message. A storage such as a memory unit or a magnetic disk device functions as message holding means for holding the message to be encrypted.

When the terminal device operates as the recipient terminal 20, a program-controlled CPU functions as decryption means for decrypting the message with the secret key and delegation key generation means for generating a delegation key by a procedure to be described later. A storage such as a memory unit and a magnetic disk device functions as secret key holding means for holding the secret key used for decryption of the encrypted message.

In a case in which, the terminal device operates as the agent terminal 30, a program-controlled CPU functions as decryption means for decrypting the message with the delegation key and inquiry means for making an inquiry to the conversion server for validation in decryption processing. A storage such as a memory unit or a magnetic disk device functions as delegation key holding means for holding the delegation key obtained from the recipient terminal 20.

In the computer device operating as the conversion server 40, a program-controlled CPU functions as judgment means for judging whether a restricted condition accompanied with the delegation key is satisfied and parameter calculation means for calculating a parameter ($c_T$ described later), which is to be returned to the agent terminal 30, from information of the delegation key.

Furthermore, the network functions (CPUs and network interfaces) of these devices function as transmitting/receiving means for supporting communications between the devices.

Next, a description will be made of the method of delegating the decryption power accompanied with the restricted condition according to this embodiment, which is implemented by the four components shown in FIG. 1. The explanation in the following uses the following descriptions of functions and algorithms.

E(enc_key, plaintext): A known encryption algorithm which uses a public key "enc_key" and a plain text "plaintext" as inputs and which outputs the corresponding cipher text.

D(dec_key), ciphertext): A known decryption algorithm which uses the cipher text "ciphertext" generated by the encryption algorithm E and the secret key "dec_key" as inputs and which outputs the corresponding plain text.

G(dec_key, policy): A key generation algorithm according to the embodiment which uses the secret key "dec_key" and the restricted condition "policy" including a valid period as inputs and which outputs the delegation key "del_key".

Φ(policy): A known judgment algorithm which outputs 1 when the restricted condition "policy" is satisfied and which outputs 0 when the restricted condition "policy" is not satisfied. The conversion server 40 holds Φ in secret.

Γ(del_key, policy, ciphertext): a proxy decryption algorithm according to the embodiment which uses the delegation key "del_key", the restricted condition "policy", and the cipher text "ciphertext" as inputs and which outputs the corresponding plain text ($\Phi$(policy)=1) or an error ($\Phi$(policy)=0).

H($\cdot$): A collision-free one-way hash function.

Here, the restricted condition "policy" is described by a general policy description including a valid period. For example, when the restricted condition is "between a time $t_1$ and a time $t_2$, for B", the judgment algorithm $\Phi$ judges whether the current time is "between the time $t_1$ and the time $t_2$" and "B is performing the proxy decryption".

The delegation of the decryption power according to the embodiment is formulated as follows with reference to FIG. 1.

(1) The sender terminal 10 transmits to the recipient terminal 20 the cipher text c=E($e_A$, m) encrypted with the public key $e_A$ corresponding to the recipient terminal 20.

(2) The recipient terminal 20 generates the delegation key del_key=G($d_A$, $\rho$) from the secret key $d_A$ and transmits del_key and $\rho$ to the agent terminal 30 in secret in order to delegate the decryption power to the agent terminal 30 only when the restricted condition $\rho$ is satisfied.

(3) The agent terminal 30 decrypts the message by m=$\Gamma$(del_key, $\rho$, c) using the delegation key del_key.

Figure 2:
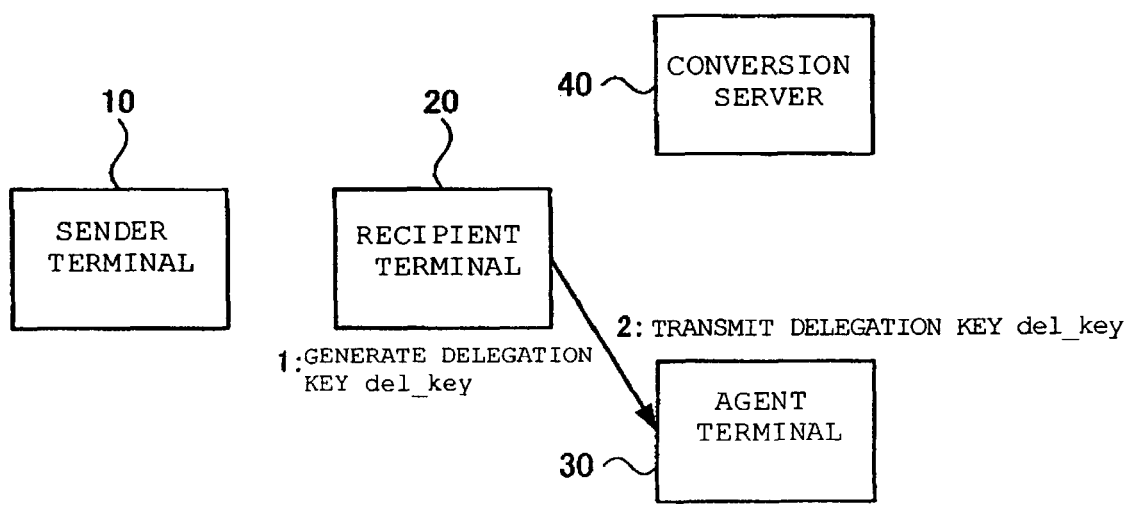
FIG. 2 is a diagram showing an example generation of a delegation key del_key and delegation of a proxy decryption power in a protocol implemented in a basic mode of the embodiment.
Figure 3:
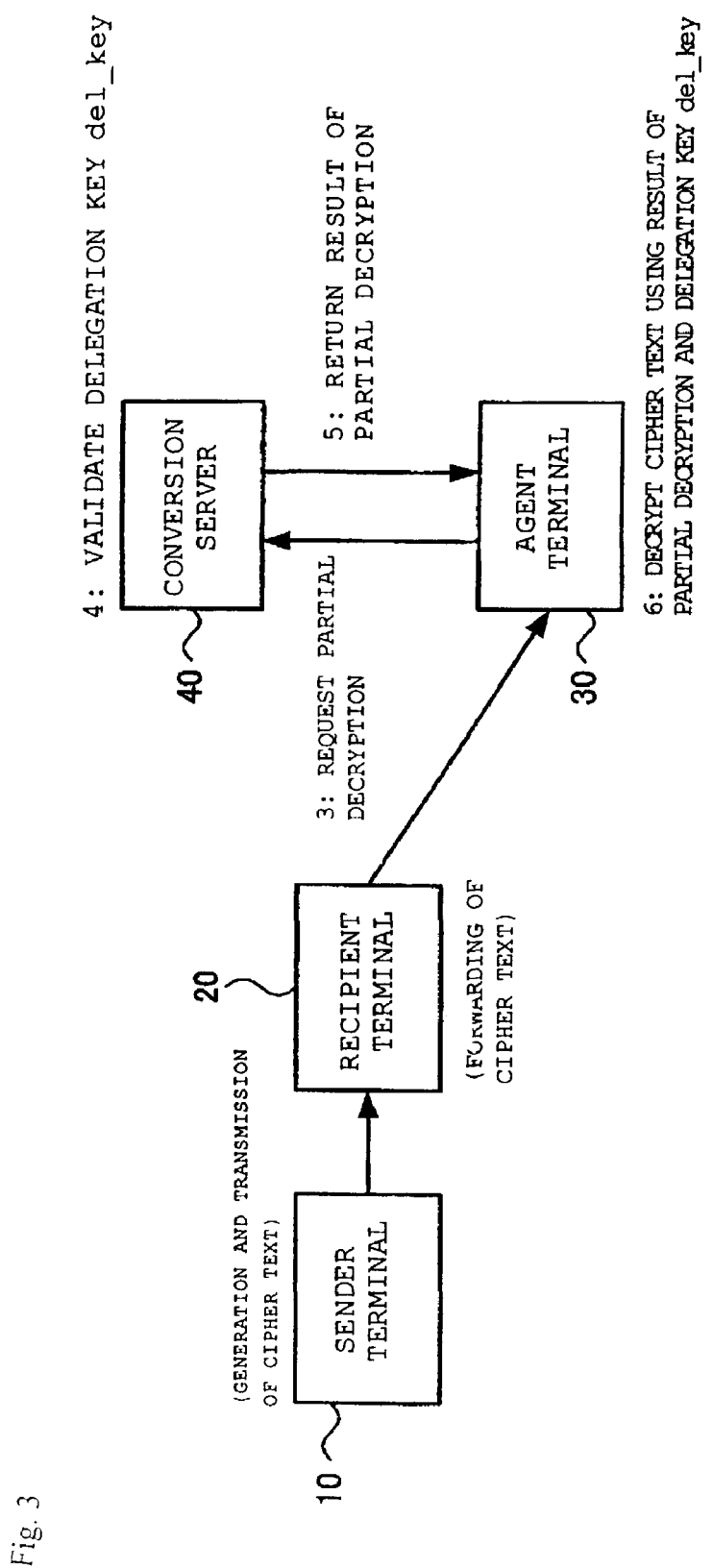
FIG. 3 is a diagram showing an example proxy decryption by an agent terminal in the protocol implemented in the basic mode of the embodiment.

In the embodiment, shown are:

(1) a structuring method of the delegation key generation algorithm G, and (2) a structuring method of the proxy decryption algorithm $\Gamma$ of "the delegation of the decryption power for the limited period" satisfying seven requirements to be described later, when the public key encryption algorithm E is an ElGamal type cryptosystem. FIGS. 2 and 3 show conceptual views of a protocol to be implemented.

Referring to FIGS. 2 and 3, in the protocol of the cryptographic communication implemented in the embodiment, First, the delegation key del_key is generated in the recipient terminal 20; and the generated delegation key del_key is transmitted to the agent terminal 30. Thereafter, when the message (cipher text) encrypted with the public key of the recipient terminal 20 is transmitted from the sender terminal 10 to the recipient terminal 20, the cipher text is forwarded from the recipient terminal 20 to the agent terminal 30.

In order to decrypt the received cipher text, (3) the agent terminal 30 transmits information contained in the delegation key to the conversion server 40 and requests to decrypt part of the cipher text. Correspondingly, (4) the conversion server 40 first, judges the validity of the delegation key del_key (whether the restricted condition is satisfied or not). If the delegation key del_key is valid, (5) the conversion server 40 decrypts part of the cipher text and returns the result thereof to the agent terminal 30. (6) The agent terminal 30 decrypts the cipher text using the obtained result of the partial decryption and the delegation key del_key.

The protocol of the cryptographic communication according to the embodiment shown in FIGS. 2 and 3 is required to satisfy the following seven requirements.

1. The agent terminal 30 cannot decrypt the message m as long as $\Phi(\rho)$=0 due to execution of the proxy decryption algorithm $\Gamma$.

2. The proxy decryption algorithm $\Gamma$ is implemented in one round communication between the agent terminal 30 and the conversion server 40.

3. The sender (sender terminal 10) does not need to know if the power is delegated on a recipient side at the time of encryption.

4. The delegation key generation algorithm G can be executed singly by the recipient terminal 20 without necessity of the communication with the conversion server 40 or the agent terminal 30.

5. The conversion server 40 does not need to hold the information dependent on the sender (sender terminal 10) and the recipient (recipient terminal 20) regarding the cipher text.

6. The conversion server 40 cannot obtain the information on the secret key $d_A$ of the recipient terminal 20 due to the execution of the proxy decryption algorithm $\Gamma$.

7. The agent terminal 30 cannot obtain the information on the secret key $d_A$ of the recipient terminal 20 due to the delegation key del_key and the execution of the proxy decryption algorithm $\Gamma$.

The above seven requirements are generally necessary to improve security and efficiency in the delegation of the decryption power. Concrete descriptions are as follows.

Requirement 1: Requirement for realizing the delegation of the decryption power based on the restricted condition.

Requirement 2: Requirement for optimization of the efficiency of the proxy decryption. Taking into a consideration that the restricted condition is checked in the conversion server 40, the one round communication between the conversion server 40 and the agent terminal 30 is optimum.

Requirement 3: Requirement for efficiency of the encryption processing in the sender terminal 10. In order that the sender terminal 10 knows if the decryption power is delegated on the recipient side, an additional communication is necessary between the sender terminal 10 and the recipient terminal 20 or the agent terminal 30.

Requirement 4: Requirement for allowing the recipient terminal 20 to easily delegate the decryption power. It is important for reducing the load on the conversion server 40 and the sender terminal 10 that the delegation of the decryption power can be executed singly by the receiver terminal 20.

Requirement 5: Requirement for reducing the load on the conversion server 40. The unnecessity of holding the information for each cipher text and for each recipient terminal 20 contributes the reduction in capacity and the improvement in security of the storage of the conversion server 40.

Requirement 6: The conversion server 40 is not allowed to know the secret key of the recipient terminal 20 and thereby prevented from improperly using the secret key $d_A$ of the recipient terminal 20.

Requirement 7: It is prevented that the agent terminal 30b would know the secret key $d_A$ of the recipient terminal 20 as a result of the delegation of the decryption power. If the secret key $d_A$ is leaked to the agent terminal 30, the agent terminal 30 is allowed to permanently decrypt the cipher text transmitted to the recipient terminal 20.

Accordingly, the requirement 7 is the most important for security.

The following parameters are used in the description below. Parameters p and q are large prime numbers satisfying q|p−1. Parameter g is an element of order q in a finite field $Z_p$. The sizes of p and q are set such that the discrete logarithm problem is difficult to be solved in a group GF(q) constituted by g as a generator in terms of an amount of calculation. Hereinafter, when not particularly mentioned, all the calculation is performed in modulo p.

The ElGamal cryptosystem is shown as follows when the secret key is x ($\in Z_q$) and the public key is $y=g_x$.

A cipher text ($c_1$, $c_2$) for the message m ($\in Z^*_p$) is calculated as $c_1=g^r$ and $c_2=my_r$ using r ($\in Z_p$) randomly selected and a public key y. For decryption, $c_2/c_1 x = m$ is calculated using the secret key x. The security of the ElGamal cryptosystem is based on the difficulty of solving the problem (Diffie-Hellman problem) that $c_1^x = y^r = g^{xr}$ is calculated from the three values g, $c_1$ (=$g_r$), and y (=$g_x$) in terms of the amount of calculation.

The ElGamal encryption scheme in the embodiment can be applied to any encryption scheme (ElGamal type encryption scheme) defined in any group GF(q) where the discrete logarithm problem is difficult to be solved in terms of the amount of calculation. For such a group, the following groups are cited in addition to a prime field of order p.

Group constituted by setting a multiplication operation in the prime field of order p to correspond to an addition operation on a curve such as an elliptic curve in any definite field.

Group constituted by using a power of a prime number p' instead of the prime number p and performing an operation in an extension field of GF(p') instead of a remainder operation modulo the prime number p'.

The delegation method of the decryption power according to the embodiment will be described below in three modes: a basic mode assuming that the conversion server 40 is a trusted party and extended modes of two types assuming that the conversion server 40 is not a trusted party. The trusted party means a member assured not to engage in acts depart from the determined procedure, for example, leaking the obtained information to others or behaving improperly in conspiracy with others.

Each of the basic mode and the extended modes assumes the followings as the procedure of the cryptographic communication.

The sender terminal 10 encrypts the message m ($\in Z^*_p$) using the ElGamal encryption and transmits the encrypted message to the recipient terminal 20. More generally, in some cases, a message M is encrypted using symmetric key encryption with a key K, and the key K is encrypted using the ElGamal encryption to be transmitted. Such a case can be equated with the embodiment by considering the key K as the message m to be transmitted. The sender terminal 10 calculates $c_1 = g^r$ and $c_2 = m e_A^r$ using r ($\in Z_q$) randomly selected and the public key $e_A = g^{d_A}$ of the recipient terminal 20. A pair of the two values ($c_1$, $c_2$) is transmitted as a cipher text to the recipient terminal 20. The decryption power of the recipient terminal 20 is delegated to the agent terminal 30, and the agent terminal 30 is requested to execute the decryption processing under a certain restricted condition in place of the recipient terminal 20.

(Basic Mode)

1. Structure of Delegation Key Generation Algorithm G

Shown is an algorithm that the recipient terminal 20 having the secret key $d_A$ ($\in Z_q$) generates the delegation key del_key for delegating the decryption power to the agent terminal 30 under the restricted condition ρ such as information of the limited period.

Figure 4:
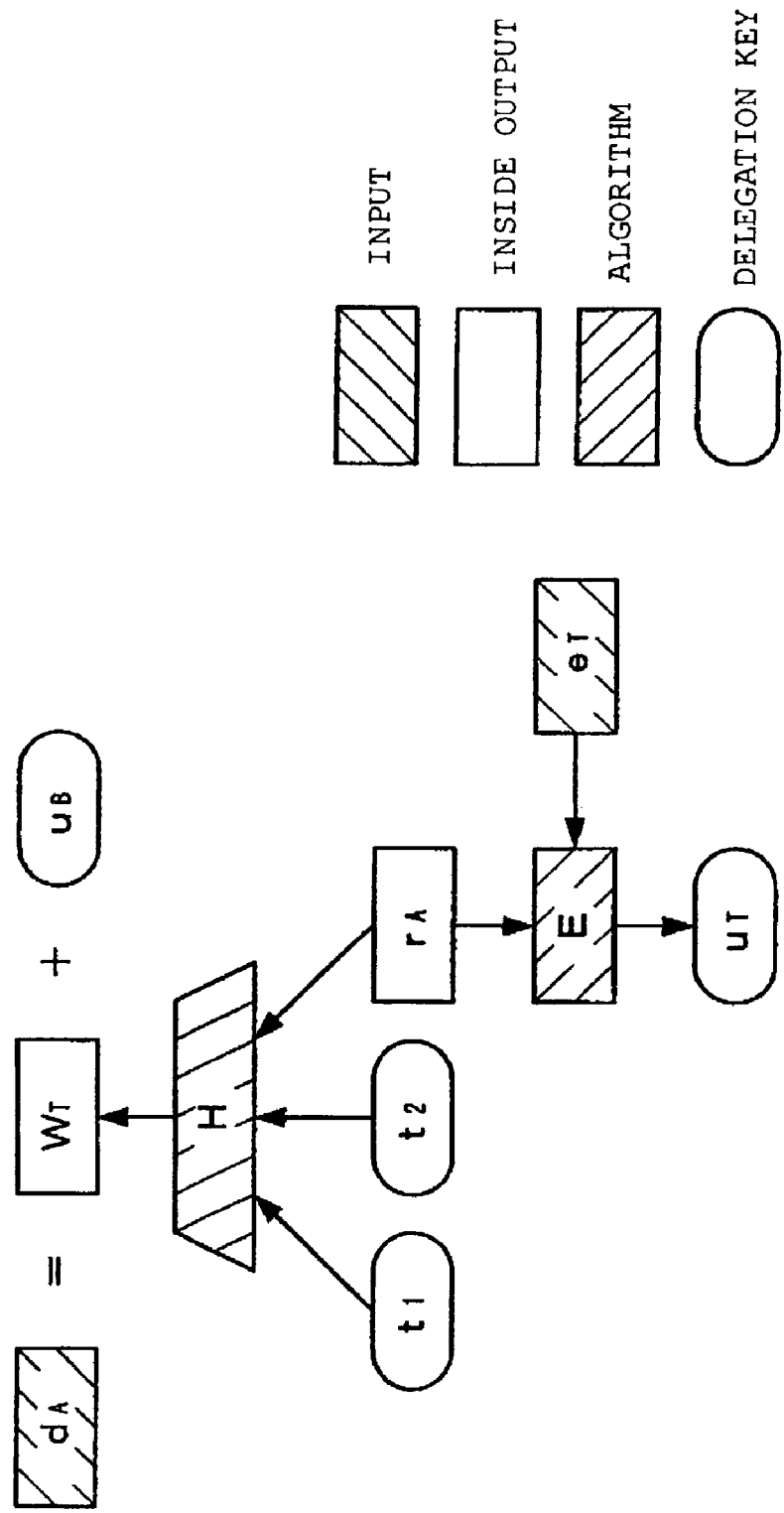
FIG. 4 is a diagram showing an example of a delegation key generation algorithm G in the embodiment.

FIG. 4 is a diagram explaining a concept of the delegation key generation algorithm G. The example shown in FIG. 4 considers a valid period ($t_1 \leq t \leq t_2$) of the decryption power has the restricted condition ρ.

The recipient terminal 20 selects a random number $r_A$ ($\in Z^*_q$) and determines $u_T$ and $u_B$ using the public key $e_T$ of the conversion server 40. The recipient terminal 20 combines $u_T$ and $u_B$ with the restricted condition ρ (the start time $t_1$ and the finish time $t_2$ in the example of FIG. 4) to generate the delegation key del_key.

$$u_T = E(e_T, r_A)$$

$$w_T = H(\rho, r_A)$$

$$u_B = d_A - w_T \pmod{q}$$

$$\text{del\_key} = <\rho, u_B, u_T> \quad \text{[Equation 1]}$$

The generated delegation key del_key is transmitted from the recipient terminal 20 to the agent terminal 30. Only in the case of satisfying the restricted condition ρ contained in the delegation key del_key, the agent terminal 30 is allowed to decrypt the message encrypted with the public key $e_A$ of the recipient terminal 20 using the delegation key del_key.

2. Structure of Proxy Decryption Algorithm Γ

In order that the agent terminal 30 may decrypt the cipher text ($c_1$, $c_2$) to the recipient terminal 20 using the delegation key del_key and the restricted condition ρ, the following processing ((a) to (c)) are performed.

Figure 5:
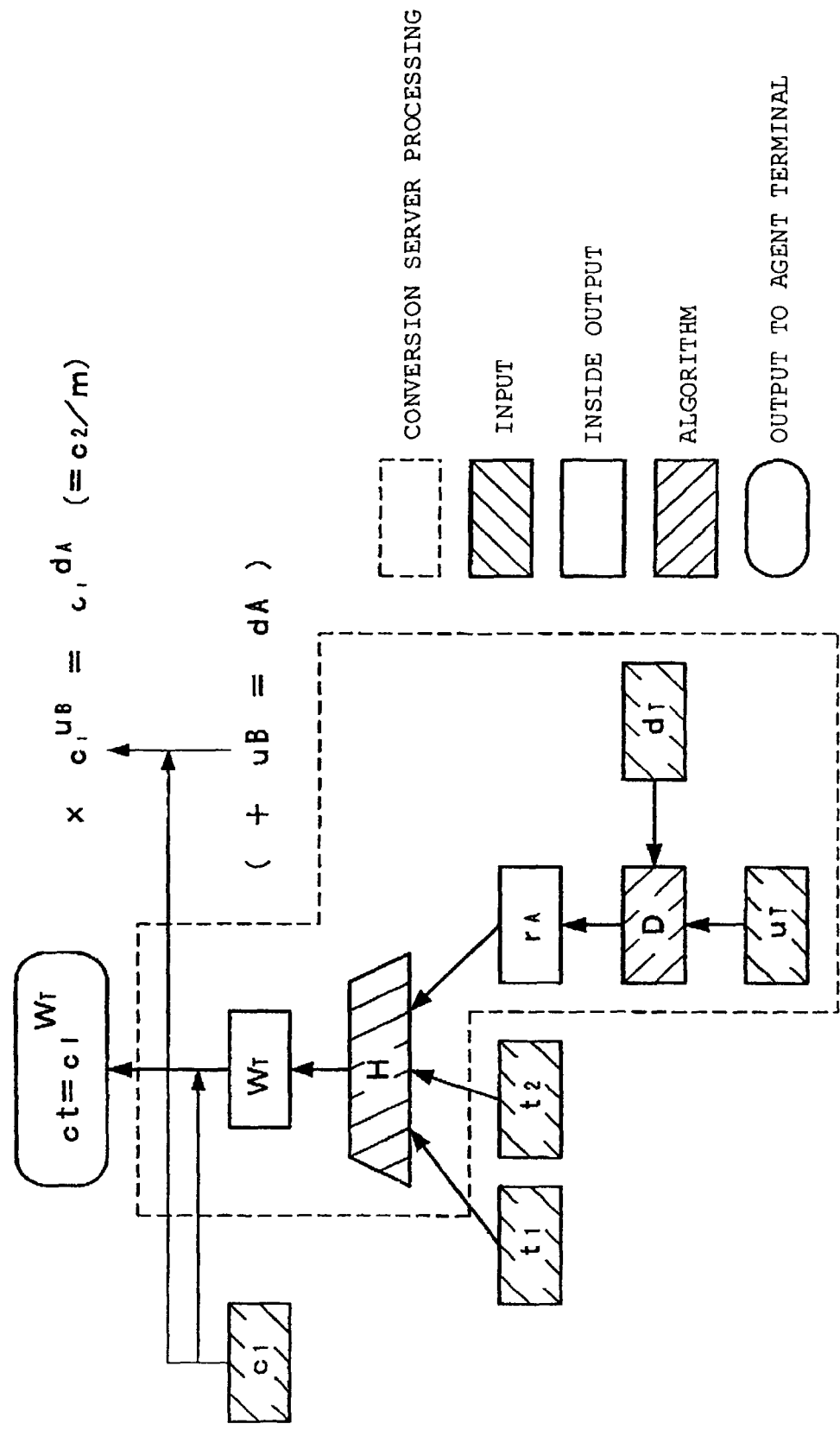
FIG. 5 is a diagram showing an example of a proxy decryption algorithm Γ in the embodiment.

FIG. 5 is a diagram explaining a concept of the proxy decryption algorithm Γ. The example shown in FIG. 5, like FIG. 4, considers the valid period ($t_1 \leq t \leq t_2$) of the decryption power as the restricted condition ρ.

(a) The agent terminal 30 transmits $u_T$ and the restricted condition ρ, which are contained in the delegation key del_key corresponding to the message (cipher text) to be decrypted, and the part $c_1$ of the cipher text to the conversion server 40.

(b) The conversion server 40 checks whether the equation $\Phi(\rho)=1$ is satisfied with the judgment algrithm Φ. When the equation is not satisfied, the conversion server 40 returns an error. In this case, the agent terminal 30 cannot perform the proxy decryption of the message. When $\Phi(\rho)=1$ is satisfied, the conversion server 40 calculates $w_T$ and $c_T$ by the following equation 2 and transmits $c_T$ to the agent terminal 30.

$$w_T = H(\rho, D(d_T, u_T))$$

$$c_T = c_1^{w_T} \quad \text{[Equation 2]}$$

(c) The agent terminal 30 decrypts the message m using $c_1$, $c_2$, and $c_T$.

$$m = c_2 c_1^{-u_B} c_T^{-1} \quad \text{[Equation 3]}$$

The above basic mode satisfies all of the aforementioned seven requirements.

First, the requirement 1 is satisfied in the proxy decryption algorithm Γ for: the agent terminal 30 cannot decrypt the message without the information of $c_T$ transmitted from the conversion server 40; the validity of the restricted condition ρ is checked by the conversion server 40 in the step (b); and if the restricted condition ρ transmitted in the step (a) is falsified, the agent terminal 30 cannot obtain $c_T$ enabling the decryption in the step (b). The requirements 2 to 5 are obviously satisfied from the above described procedure.

Next, the conversion server 40 knows only $d_A - u_B$ regarding the secret key $d_A$ of the recipient terminal 20 during execution of the proxy decryption algorithm Γ. Here, since the $u_B$ is not revealed to the conversion server 40, the conversion server 40 cannot obtain the information on the secret key $d_A$ of the recipient terminal 20, thus satisfying the requirement 6.

At last, it will be shown that the basic mode satisfies the requirement 7. All information that the agent terminal 30 can obtain is ρ, $c_1$, $c_2$, $c_T$, $u_B$, $e_A$, and $e_T$. Since for the secret key $d_A$, the equation $d_A = u_B + w_T \pmod{q}$ is established and only the conversion server 40 having $d_T$ can know $w_T = H(\rho, D(d_T, u_T))$, the secret key $d_A$ can be considered to share a secret between the agent terminal 30 having the $u_B$ and the conversion server 40 having $w_T$. $c_T$ is then a result of the partial decryption in the (2, 2) threshold decryption scheme for the cipher text ($c_1$, $c_2$) by the conversion server 40. Accordingly, the agent terminal 30 cannot obtain the information on the secret key $d_A$ by itself due to the discussion of security of the threshold decryption scheme. Thus, it can be seen that the requirement 7 is satisfied.

(Extended Mode 1)

The above described basic mode assumes that the conversion server is the trusted party. If the conversion server 40 improperly notifies the agent terminal 30 of $w_T$, the agent terminal 30 can decrypt the secret key $d_A$ of the recipient terminal 20 from $d_A = u_B + w_T \pmod{q}$. Accordingly, the security heavily depends on credibility of the conversion server 40. Therefore, proposed is a mode (extended mode 1) of preventing impropriety made by a single conversion server by secret sharing of the function of the conversion server 40 shown in the basic mode using a plurality of conversion servers.

Figure 6:
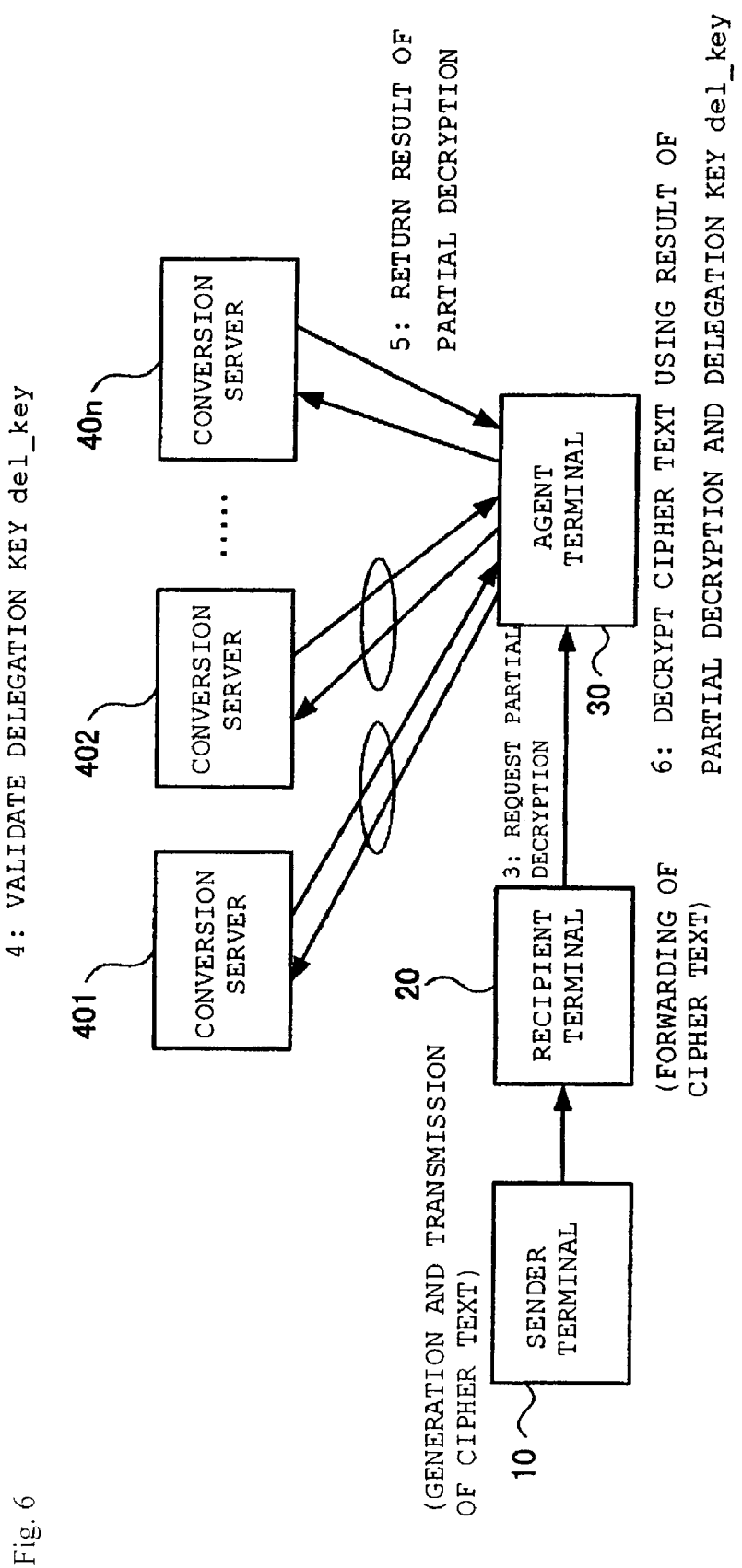
FIG. 6 is a diagram showing an example of a protocol implemented in an extended mode 1 of the embodiment.

FIG. 6 is a diagram explaining a concept of a protocol implemented in Extended Mode 1.

In Extended Mode 1, execution of the proxy decryption algorithm Γ requires checking by a plurality of conversion servers 40i ($1 \leq i \leq n$). The conversion servers 40i and the agent terminal 30 cannot decrypt the message improperly or obtain the secret key $d_A$ as long as any one of the conversion servers 40i operates correctly. In the following explanation, the public keys of the conversion server 40i are $e_i$; the decryption keys thereof are $d_i$; and the IDs thereof are i.

1. Structure of Delegation Key Generation Algorithm G

Shown is an algorithm that the recipient terminal 20 having the secret key $d_A$ ($\in Z_q$) generates the delegation key del_key for delegating the decryption power to the agent terminal 30 under a certain restricted condition.

First, the recipient terminal 20 selects a set of the conversion servers 40i neccessary for the proxy decryption. Here, a set (list) of IDs of the selected conversion servers 40i is T={1, . . . , n} (n (=|T|) is the number of selected conversion servers). The restricted condition of which validation is desired to be requested for the conversion servers 40i is ρ.

Next, the recipient terminal 20 selects n random numbers $r_1, \ldots, r_n$ ($\in Z_p$) and determines $u_1, \ldots, u_n$ by the following equation 4 using the public keys $e_i$ of the conversion servers 40i.

$$u_i = E(e_i, r_i) \; (i \in T) \quad \text{[Equation 4]}$$

$u_B$ is calculated by the following equation 5.

$$w_i = H(\rho, r_i) \; (i \in T) \quad \text{[Equation 5]}$$
$$u_B = d_A - \sum_{i \in T} w_i \pmod{q}$$

From the results thereof, the delecation key del_key is generated.

$$\text{del\_key} = \langle u_B, u_1, \ldots, u_n, T \rangle$$

2. Structure of Proxy Decryption Algorithm Γ

In order that the agent terminal 30 may decrypt the cipher text ($c_1$, $c_2$) to the recipient terminal 20 using the restricted condition ρ and the delegation key del_key, the following processing ((a) to (c)) are performed.

(a) The agent terminal 30 specifies the delegation key del_key corresponding to the message (cipher text) to be decrypted and transmits the restricted condition ρ and $u_T$, which are contained in the delegation key del_key, and the part $c_1$ of the cipher text to the conversion servers 40i for all i ($\in$T).

(b) Each of the conversion servers 40i checks whether the equation Φ(ρ)=1 is satisfied. When the equation is not satisfied, the conversion server 40i returns an error. In this case, the agent terminal 30 cannot perform the proxy decryption of the message (cipher text). When (Φ(ρ)=1 is satisfied, the conversion server 40i calculates $w_i$ and $c_{T_i}$ as the following equation 6 and sends obtained $c_{T_i}$ to the agent terminal 30.

$$w_i = H(\rho, D(d_i, u_i))$$

$$c_{T_i} = c_1^{w_i} \quad \text{[Equation 6]}$$

(c) The agent terminal 30 decrypts the message m using $c_1$, $c_2$, $c_{T_1}, \ldots, c_{T_n}$.

$$m = c_2 c_1^{-u_B} \left( \prod_{i \in T} c_{T_i} \right)^{-1} \quad \text{[Equation 7]}$$

It will be shown that Extended Mode 1 satisfies all of the aforementioned seven requirements. Since for the secret key $d_A$, the equation $d_A = u_B + w_1 + \ldots + w_n \pmod{q}$ is established and only the conversion servers 40i having the secret keys $d_i$ can know $w_i = H(\rho, D(d_i, u_i))$, the secret key $d_A$ can be considered to share a secret among the agent terminal 30 having $u_B$ and the n conversion servers 401, . . . , 40n respectively having $w_i$. $c_{T_1}, \ldots, c_{T_n}$ are then considered as a result of the partial decryption in the (n+1, n+1) threshold decryption scheme for the cipher text ($c_1$, $c_2$) by the conversion servers 401, . . . , 40n. The requirement 1 is satisfied in the proxy decryption algorithm Γ for: the agent terminal 30 cannot decrypt the message without the information of $c_{T_1}, \ldots c_{T_n}$ transmitted from all of the n conversion servers; the validity of a decryption time is checked by all the conversion servers 401, . . . , 40n in the step (b); and if the restricted condition ρ that the agent terminal 30 transmits to the conversion servers 40i in the step (a) is falsified, the agent terminal 30 cannot obtain $c_{T_i}$ necessary for decryption in the step (b).

The requirements 2 to 5 are, similarly to the basic mode, obviously satisfied from the above described procedure. The requirements 6 and 7 are satisfied by the security of the threshold decryption scheme. Extended Mode 1 requires that the check by all of the conversion servers 401, 40n specified by the recipient terminal 20 is passed for execution of the proxy decryption algorithm Γ. Accordingly, if any one of the conversion servers 40i operates correctly, the security is ensured. Therefore, Extended Mode 1 is more excellent than the basic mode in a point of not being dependent on credibility of a single server. On the other hand, the message length of the delegation key del_key and the communication amount necessary for the proxy decryption are proportional to the number n of conversion servers 40i. However, the number n is a parameter that the recipient can optionally select depending on the degree of security that the recipient requires for the delegation of the decryption power. Extended Mode 1 is adapted to the actual model in a point of requiring more costs for advanced security. The variation of n does not influence the decryption in the sender terminal 10 or a storage area size of the conversion server and influences only the recipient terminal 20 and the agent terminal 30, thus significantly contributing a system extensibility.

(Extended Mode 2)

Figure 7:
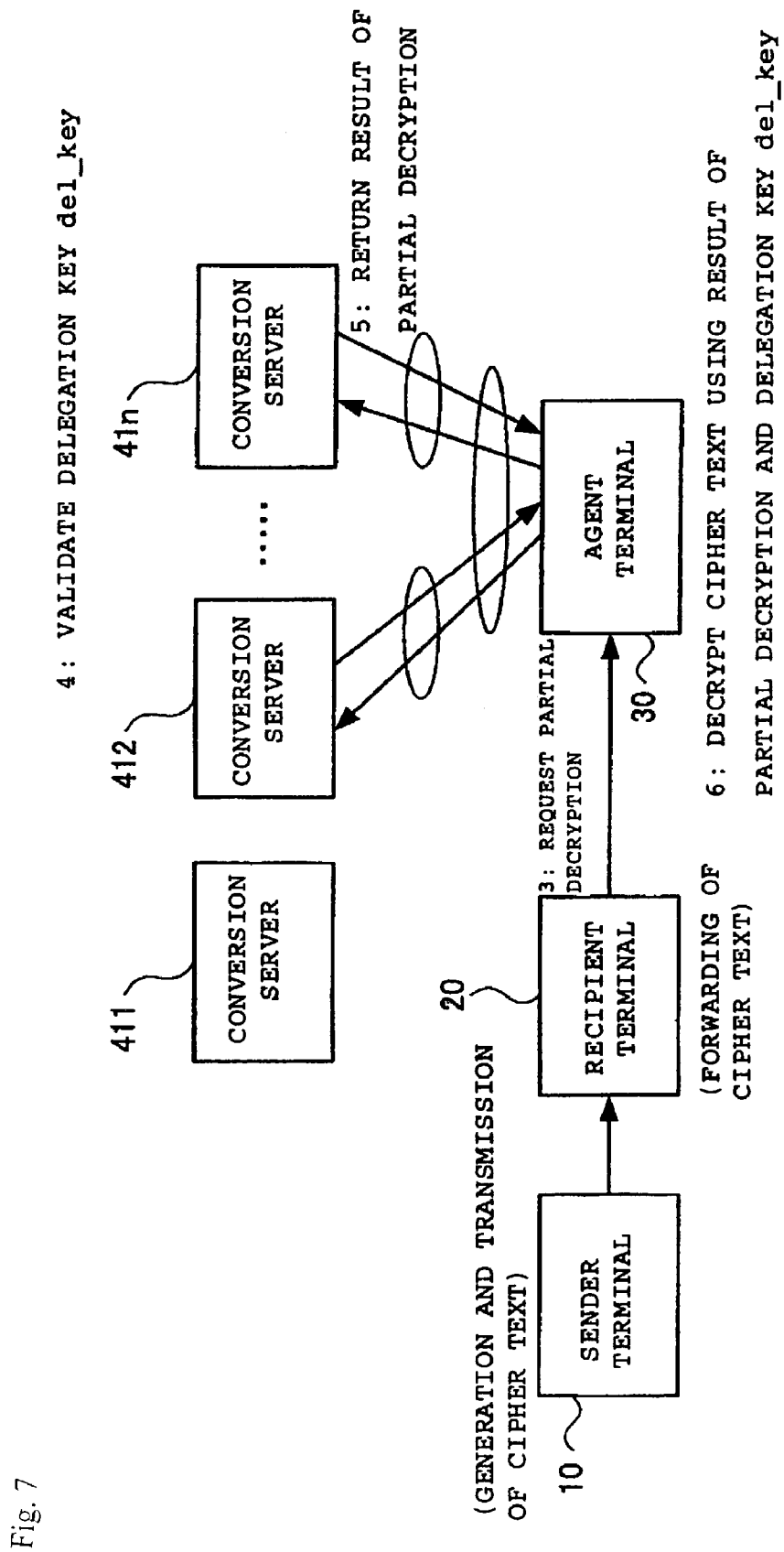
FIG. 7 is a diagram showing an example of a protocol implemented in an extended mode 2 of the embodiment.

FIG. 7 is a diagram explaining a concept of a protocol implemented in Extended Mode 2. Extended Mode 1 requires that the validation by all the n conversion servers 40i is passed for the decryption of the message (cipher text). Modification is made in Extended Mode 2 so that the message can be encrypted by passing the validation of t conversion servers 41$i$ out of n conversion servers 41$i$ (1≦i–n). In the following explanation, the public keys of the conversion servers 41$i$ are $e_i$; the decryption keys thereof are $d_i$; and the IDs thereof are i.

1. Structure of Delegation Key Generation Algorithm G

Shown is an algorithm that the recipient terminal 20 having the secret key $d_A$ ($\in Z_q$) generates the delegation key del_key for delegating the decryption power to the agent terminal 30 under a certain restricted condition.

First, the recipient terminal 20 selects a set of the conversion servers 41$i$ neccessary for the proxy decryption. Here, a set (list) of IDs of the selected conversion servers 41$i$ is T={1, . . . , n} (n (=|T|) is the number of selected conversion servers). The restricted condition of which validation is desired to be requested for the conversion servers 41$i$ is ρ.

Next, the recipient terminal 20 selects n random numbers $r_1, \ldots r_n$ ($\in Z_p$) and determines $u_1, \ldots, u_n$ by the following equation 8 using the public keys $e_i$ of the conversion servers 41$i$.

$$u_i = E(e_i, r_i) \ (i \in T) \quad \text{[Equation 8]}$$

A (n−1)th degree polynomial f(x) is defined as the following equation 9.

$$w_i = H(\rho, r_i) \ (i \in T) \quad \text{[Equation 9]}$$

$$f(x) = \sum_{i \in Y} \lambda i(x) w_i \pmod{q}$$

Subsequenly, $\lambda i(x)$ $$\lambda i(x) = \prod_{i \in T, j \neq i} (x - j)(i - j)^{-1} \bmod q$$

$u_B$ is calculated by the following equation 10.

$$u_B = d_A - f(0) \pmod{q} \quad \text{[Equation 10]}$$

A set $\Gamma = \{i_1, \ldots, i_{n-k}\}$ of (n–k) integers is selected from $Z_q \setminus T$, and $\tau_j$ (j=1, . . . , n–k) ($\in \Gamma$) are calculated as $\tau_j = f(i_j)$. The delegation key del_key is generated as follows.

$$\text{del\_key} = <\tau_1, \ldots, \tau_{n-k}, u_B, u_1, \ldots, u_n, T>$$

2. Structure of Proxy Decryption Algorithm Γ

In order that the agent terminal 30 decrypt the cipher text ($c_1, c_2$) to the recipient terminal 20 using the restricted condition ρ and the delegation key del_key, the following processing ((a) to (c)) are performed.

(a) The agent terminal 30 specifies the delegation key del_key corresponding to the message (cipher text) to be decrypted and selects a subset T' of the set T (T' ⊂ T∧|T'|=k). The agent terminal 30 transmits the restricted condition ρ and $u_i$, which are contained in the delegation key del_key, and the part $c_1$ of the cipher text to the conversion servers 41$i$ for all i (∈T').

(b) Each of the conversion servers 41$i$ checks whether the equation Φ(ρ)=1 is satisfied. When the equation is not satisfied, the conversion server 41$i$ returns an error. In this case, the agent terminal 30 cannot perform the proxy decryption of the message (cipher text). When Φ(ρ)=1 is satisfied, the conversion server 41$i$ calculates $w_i$ and $c_{Ti}$ as the following equation 11 and transmits obtained $c_{Ti}$ to the agent terminal 30.

$$w_i = H(\rho, D(d_i, u_i))$$

$$c_{Ti} = c_l^{w_i} \quad \text{[Equation 11]}$$

(c) The agent terminal 30 decrypts the message m using $c_1, c_2, c_{T1}, \ldots, c_{Tk}$.

$$m = c_2 c_1^{-\left(u_B + \sum_{j=1}^{n-k} \theta_{i_j} \tau_j\right)} \left(\prod_{i \in T} c_{Ti}^{\theta_i}\right)^{-1} \quad \text{[Equation 12]}$$

$$\theta_i = \prod_{i \in T \cup \Gamma, j \neq i} j \times (j-1)^{-1} \bmod q$$

Extended Mode 2, similarly to Extended Mode 1, satisfies all of the aforementioned seven requirements. Extended Mode 2 requires that the check by the t conversion servers out of the n conversion servers 411, . . . , 41$_n$ specified by the recipient terminal 20 is passed for execution of the proxy decryption algorithm Γ. Accordingly, if any one of the t conversion servers 41$i$ operates correctly, the security is ensured, similarly to Extended Mode 1. As described above, the embodiment (including the basic mode and Extended Modes 1 and 2) utilizes the conversion servers 40, 40$i$, and 41$i$, which are neutral third parties. Accordingly, the cryptographic communication system can be realized where the recipient terminal 20 receiving the cipher text can request the agent terminal 30 to execute the decryption processing in place of the recipient terminal 20 only when the restricted condition such as a valid period is satisfied. For example, the authentication of the agent terminal 30 by the recipient terminal 20 or acquisition of information satisfying the restricted condition for charges can be set as the restricted condition.

The characteristics of the cryptographic communication system are summarized as follows:
- By applying the technology of threshold decryption, operation of the secret key of the recipient terminal 20 is shared between the conversion server 40 and the agent terminal 30. Accordingly, the decryption processing of the cipher text can be performed only when the agent terminal 30 passes the check by the conversion server 40. Moreover, neither the conversion server 40 nor the agent terminal 30 can know the secret key of the recipient throughout the decryption processing.
- The function of checking the restricted condition is included in the decryption processing by use of the one-way hash function. Accordingly, the agent terminal 30 cannot perform decryption unless the agent terminal 30 passes the check whether the restricted condition is satisfied, the check being executed by the conversion server 40. Moreover, if the agent terminal 30 reports to the conversion server 40 a falsified restricted condition, which should be satisfied, the agent terminal 30 cannot continue the decryption processing.
- Since the public key of the conversion server 40 is utilized, the delegation of the decryption power can be completed by generating the delegation key and giving the delegation key to the agent terminal 30 only by the recipient terminal 20. Consequently, the decryption power can be easily delegated.

Since no modification is added to the encryption system in the embodiment, the embodiment can be applied to many existing encryption services.

Next, a description will be made of examples of the embodiment applied to various network systems.

(Proxy Decryption Service Provider)

The cryptographic communication system according to the embodiment can be implemented in a network system including a plurality of host computers (hereinafter, abbreviated as hosts) and performing cryptographic communication by providing a proxy decryption service provider operating as the conversion server 40 for the network.

Figure 8:
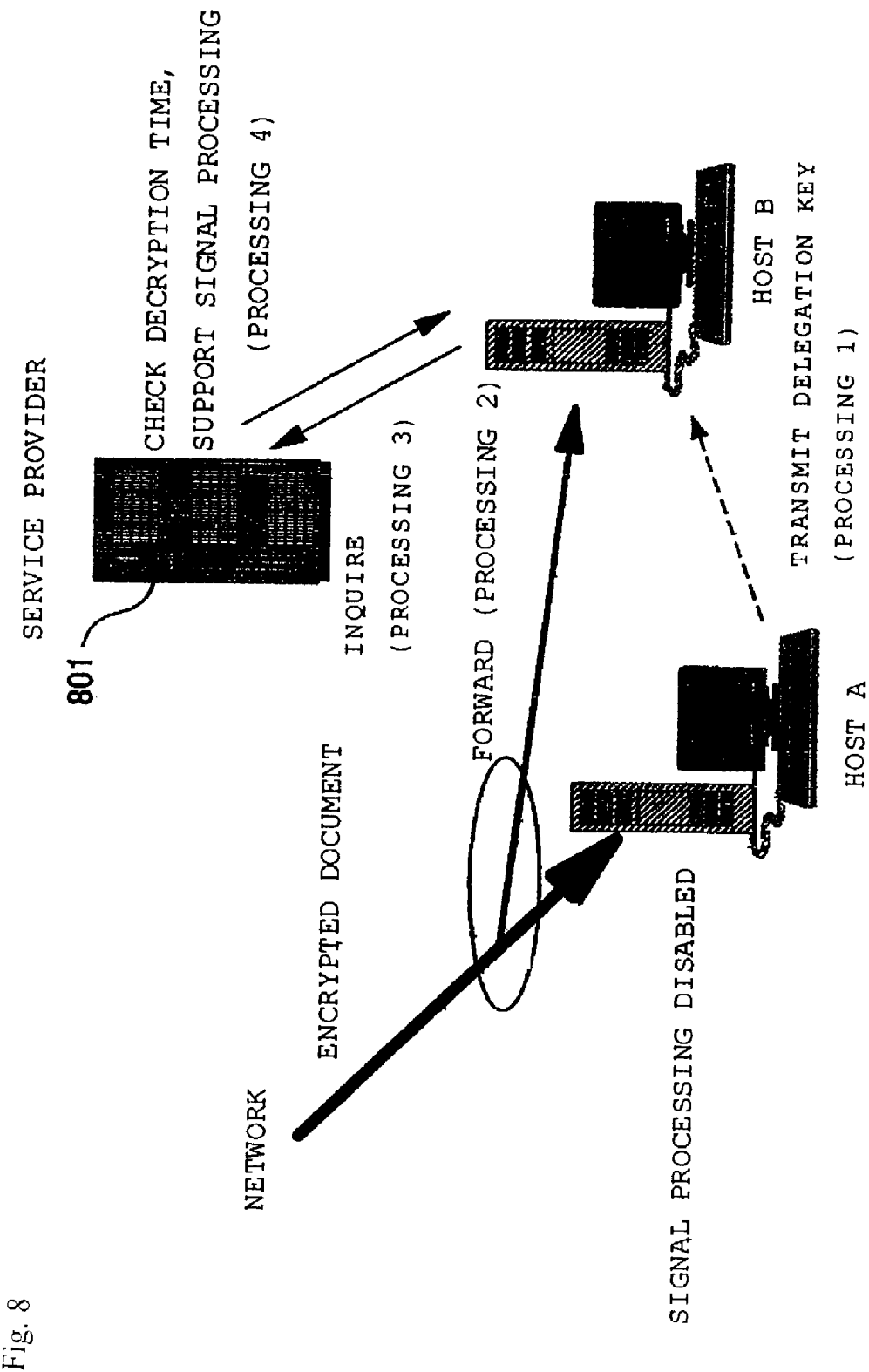
FIG. 8 is a view showing an example of a network constitution implementing the cryptographic communication system of the embodiment with a proxy decryption service provider.

FIG. 8 is a view describing a network embodiment realizing the cryptographic communication system of the embodiment by provision of the proxy decryption service provider.

A host A (corresponding to the recipient terminal 20) receives and decrypts a message (cipher text) in a predetermined cryptographic communication. When the host A comes not to perform the decryption processing of the cipher text because of an increase in communication traffic of the network or temporary failure, it is necessary to temporarily delegate the decryption processing to a host B (corresponding to the agent terminal 30) having a function of decrypting the message. In such a case, a situation is conceived, where the host A wants to have the decryption power back from the host B after the function of the host A is recovered. In order to support such proxy decryption, a service provider 801 serving as the conversion server 40 described in the embodiment is provided on the network.

The service provider 801 supports the decryption processing of the host B by secret sharing using the technology of the threshold decryption based on the embodiment. For the decryption processing, the service provider 801 checks the encryption time or charges in accordance with the number of times of decryption to satisfy the restricted condition of the embodiment.

Referring to FIG. 8, a description will be made of a processing flow of the cryptographic communication in the network system including the service provider 801.

First, the delegation key del_key is generated in the host A and passed to the host B (processing 1). The host A sets the received cipher text to be forwarded to the host B.

When the host A receives from the network the cipher text addressed to the host A, the cipher text is forwarded to the host B (processing 2). In response to reception of the cipher text, the host B inquires the service provider 801 to decrypt the arriving cipher text (processing 3). The service provider 801 checks the decryption time and supports the decryption processing. In some cases, the service provider 801 charges the host A in accordance with the number of decryption times (processing 4).

In the system performing accounting, the delegation of power itself is not charged, and the decryption processing is charged. Therefore, there is an advantage that it is sufficient if only the charge in accordance with the number of using times is paid. In the system not performing accounting, the construction of the cryptographic communication system including the service provider 801 allows to provide a service realizing secure time-limited delegation of the decryption power on the network.

(P2P Database with Tolerance and Confidentiality)

A database system using a peer to peer (P2P) technology (P2P database) is designed such that data included in each host (peer) can be retrieved and downloaded from another peer to constitute an enormous database. Since an excess storage of each peer can be utilized by another peer, an excess source can be efficiently utilized.

In the P2P database, since the entire network is considered as one enormous storage, the encryption technology is used for limiting access to data of the peers. However, differently from a conventional database controlled by a central server, withdrawal (disconnected state) of the peers from the network can frequently occur in the P2P network. Specifically, when the predetermined peer is required to access data saved in the P2P database in an encrypted state, there is a possibility that a peer holding a key necessary for decryption is not in a connected state with the network. Therefore, while being in the disconnected state, if the peer can delegate the decryption power to another peer in the connected state that can be trusted, accessibility to encrypted data is significantly extended, thus making it possible to construct the P2P database with confidentiality and tolerance.

Figure 9:
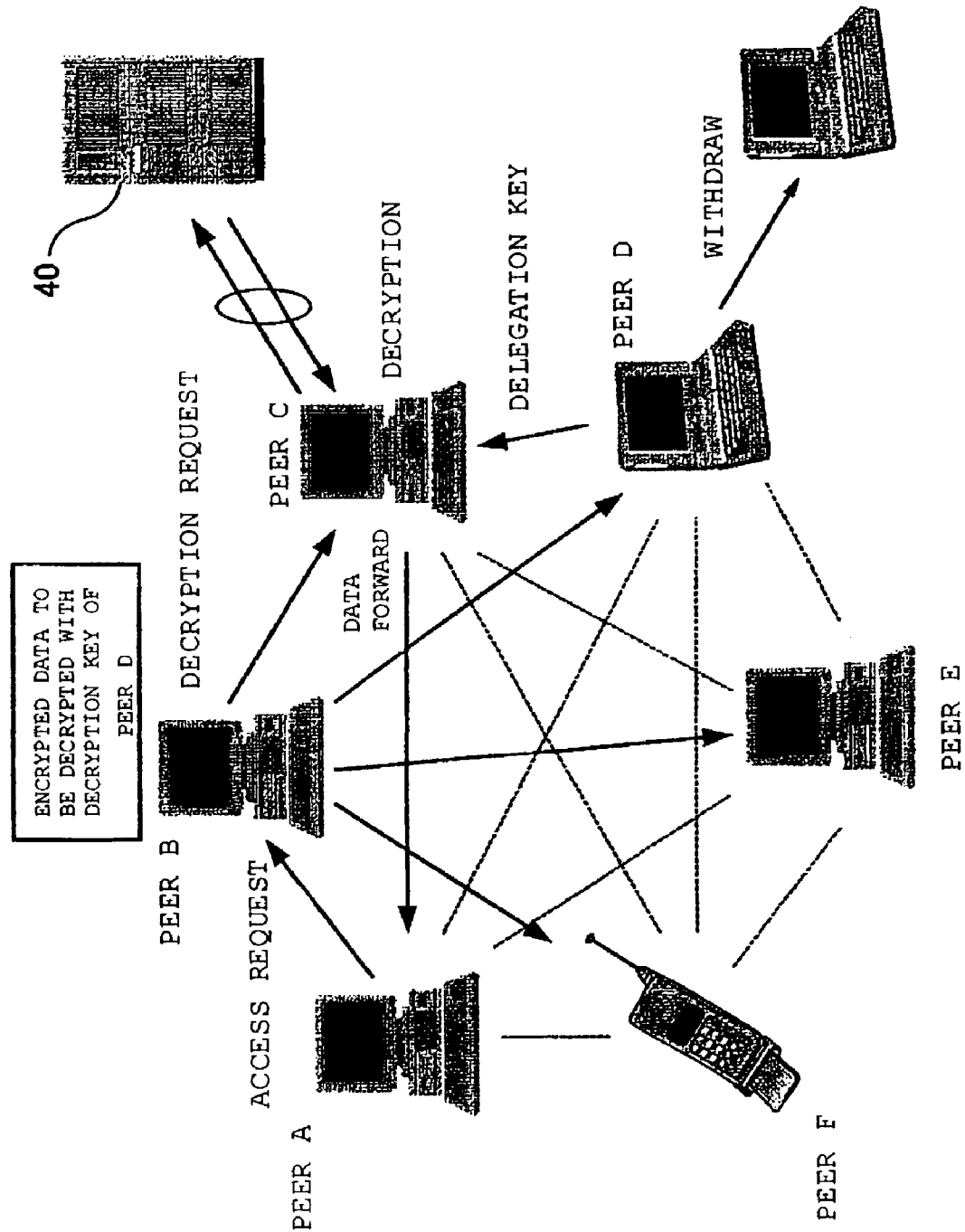
FIG. 9 is a view showing a constitution of a P2P database to which the embodiment is applied.

FIG. 9 is a view showing a constitution of a P2P database to which the embodiment is applied. In FIG. 9, it is assumed that a peer D among six peers connected to the P2P network is separated from the network. At this time, the decryption power of the peer D is given to the peer C under the time limitation (namely, pass the delegation key del_key with the time restricted condition to the peer C). In this state, a request to access data, which is to be decrypted with the decryption key (secret key) of the peer D, is issued from the predetermined peer A. The peer B having the data requests the peer C to decrypt the data, the peer C being given the delegation key del_key from the peer D. In response to the request, the peer C performs the proxy decryption of the data under the restricted condition contained in the delegation key del_key through support by the conversion server 40.

(Group Key Generation for P2P Multicast)

Figure 10:
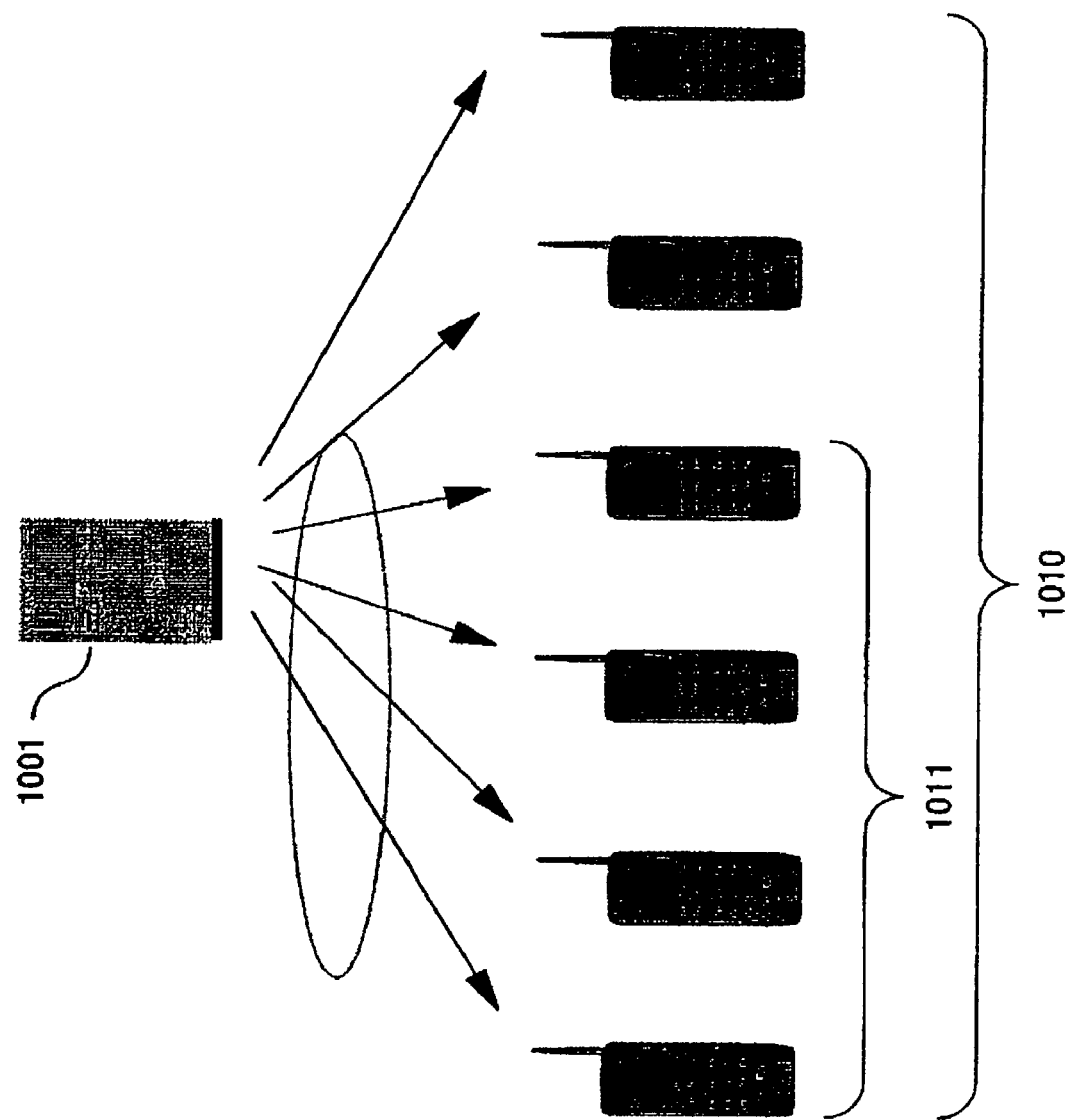
FIG. 10 is a view showing an example of multicast implemented in a P2P network to which the embodiment is applied.

In a P2P network as shown in FIG. 10, when a predetermined transmitter 1001 distributes a message to a predetermined group 1010, there is a case that the message can be decrypted only when group members 1011 of more than a certain number approve. Examples thereof include transmission of a subject of an agreement and distribution of encrypted contents. In such a case, sometimes, a predetermined group member has an intention of approval but does not join an approval protocol because the peer is not connected to the network, and the group as a whole cannot decrypt the message.

In such a case, the embodiment is applied to the P2P network, and the delegation key del_key is passed to the peer of another group member. Accordingly, the time-limited delegation of the decryption power can be performed. Specifically, the approval for decryption of the message is delegated to another group member under the time restriction contained in the delegation key del_key.

(Control of Access to Encrypted data—Sender and Recipient of Cipher Text are the Same)

In the cryptographic system according to the embodiment, the sender of the cipher text and the recipient thereof do not need to be separate entities. The recipient can be the sender of the cipher text.

Figure 11:
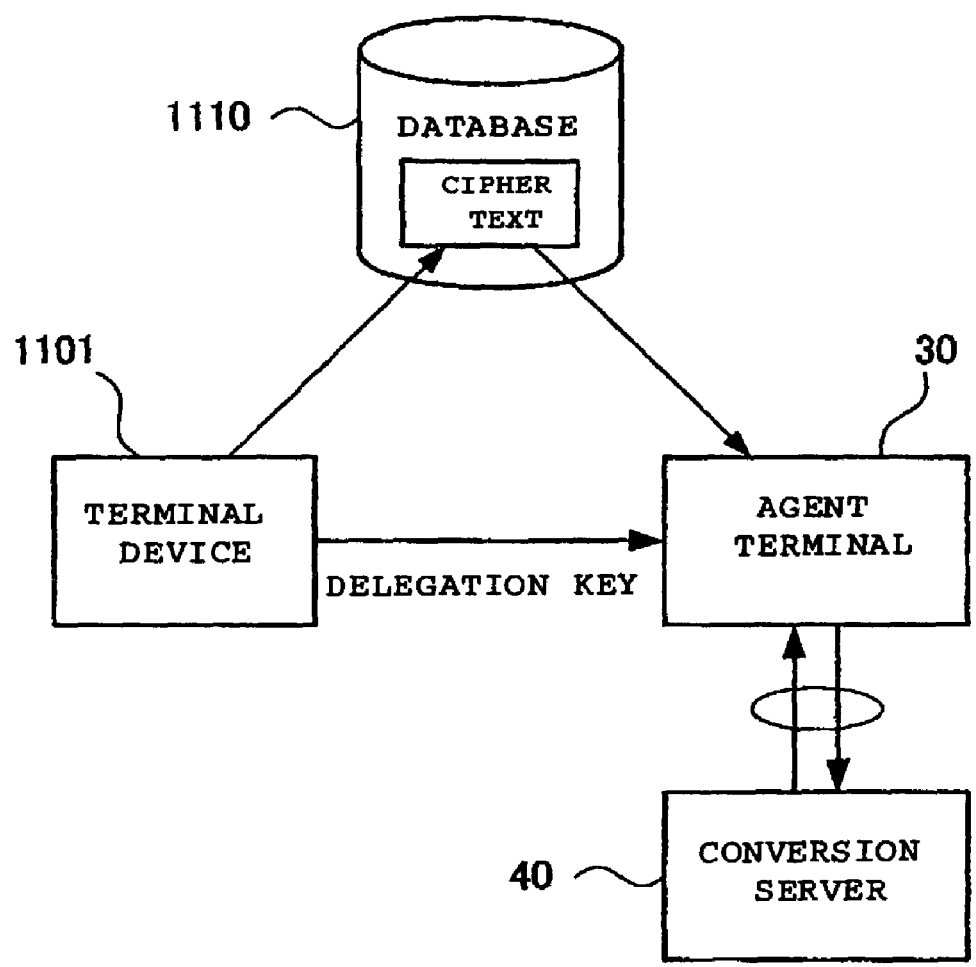
FIG. 11 is a diagram showing an example constitution of a system where a recipient is a sender of a cipher text in a cryptographic system to which the embodiment is applied.

FIG. 11 is a diagram showing an embodiment of a system where the recipient is the sender of the cipher text. As shown in FIG. 11, a terminal device 1101 serving as the recipient and the sender generates a cipher text in advance that can be decrypted only with the secret key of its own and stores the generated cipher text in an open database 1110. The terminal device 1101 generates the delegation key del_key and requests the agent terminal 30 to perform the proxy decryption of the cipher text. By using the cryptographic system of the embodiment, a certain condition can be imposed on the exercise of the proxy decryption power of the agent terminal 30. Password management using portable terminal) using the cryptographic system according to the embodiment, information management can be performed by a portable terminal.

Figure 12:
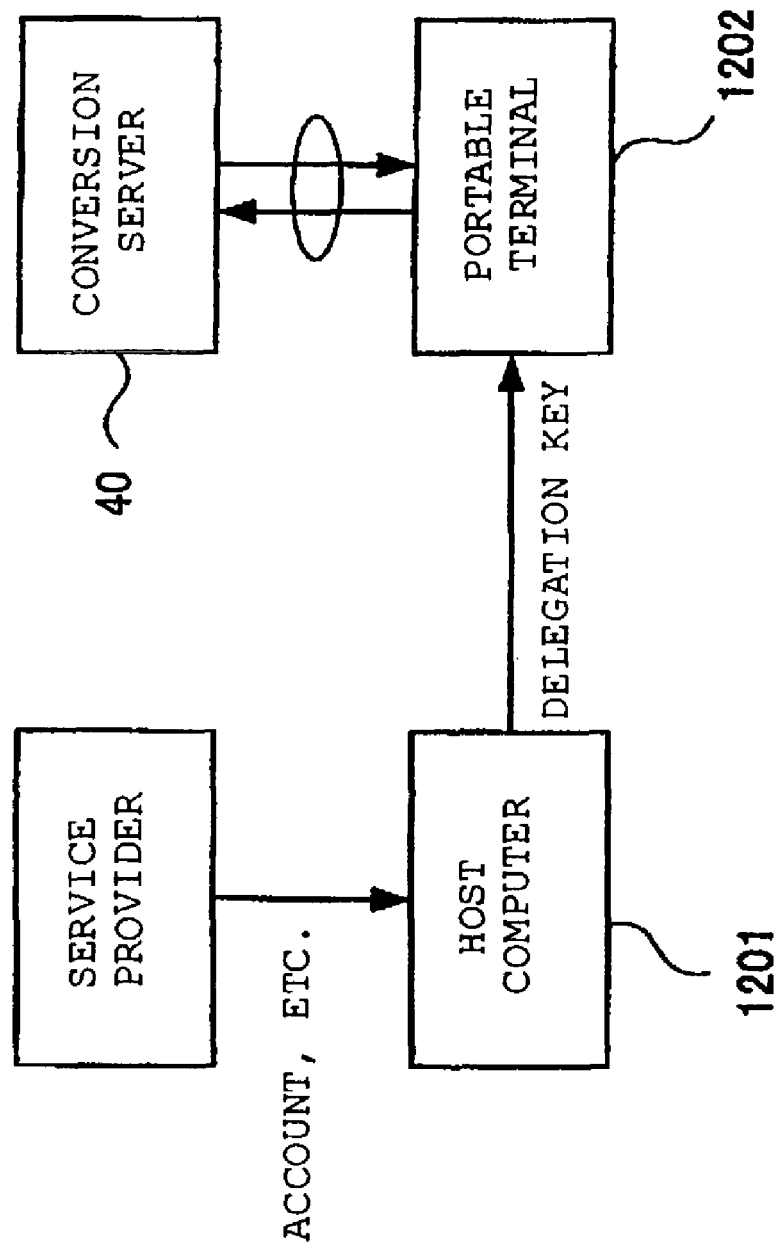
FIG. 12 is a diagram showing an information management method by a portable terminal in a cryptographic system to which the embodiment is applied.

FIG. 12 is a diagram showing an embodiment of a management system. Referring to FIG. 12, the management system includes a host computer 1201 corresponding to the sender terminal 10 and the recipient terminal 20 and a portable terminal 1202 corresponding to the agent terminal 30. Information (for example, password) stored in the host computer 1201 is encrypted, and the delegation key del_key to decrypt the information has been passed to the portable terminal 1202. Even when the host computer 1201 is not operated (for example, when a user is separate from the host computer 1201), the portable terminal 1202 communicates with the conversion server 40 to be supported for the decryption processing, so that the cipher text can be completely decrypted. The delegation key del_key can be transmitted from the host computer 1201 to the portable terminal 1202 by means such as an electronic mail. Even when a mobile phone or the like is used as the portable terminal 1202, the portable device 1202 can communicate with the conversion server 40 to perform the decryption processing by utilizing a data communication service such as i-mode provided by NTT DoCoMo Inc.

In such a management system, the restricted condition (time condition or password that only the owner of the portable terminal 1202 knows) for allowing the proxy decryption in the portable terminal 1202 is previously described. Accordingly, when the portable terminal 1202 is lost, the risk that another person could decrypt the cipher text can be avoided. Exchange of contract document requiring to sign contact document for a predetermined period).

There is an application where contents thereof is allowed to be read by decrypting the cipher text only when an electronic signature for completing a contract for a predetermined period is obtained. For example, in the case of utilizing paid digital contents encrypted, the contents are allowed to be decrypted only in the terminal device having the electronic signature indicating that payment is made within a period. In such a case, a transmission system of cipher texts can be also constructed by utilizing the cryptographic system of the embodiment.

Figure 13:
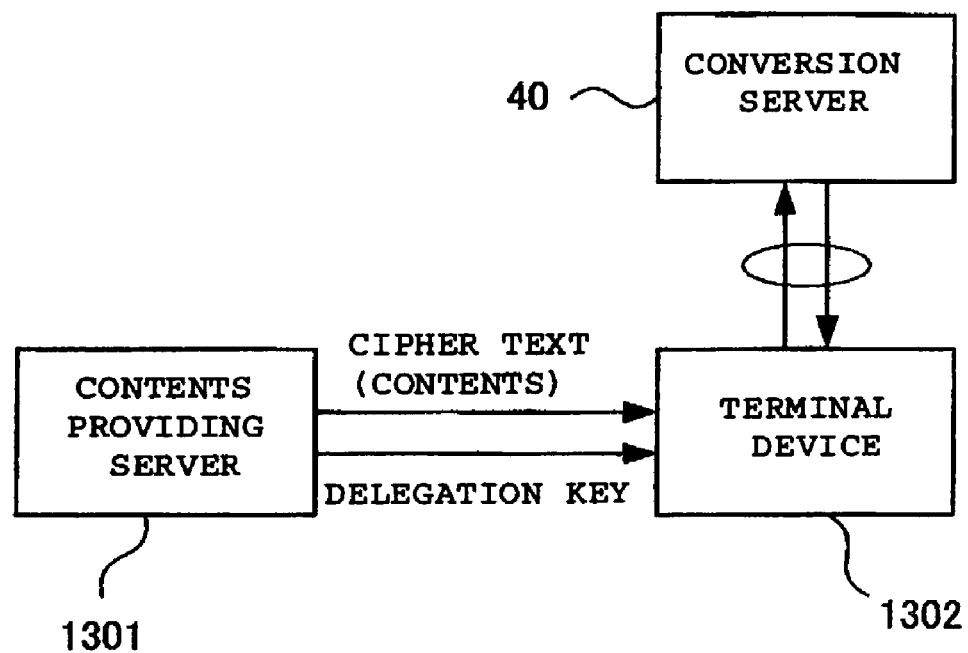
FIG. 13 is a diagram showing an example constitution of a cipher text providing system allowing decryption of a cipher text only in a terminal device having an electronic signature in a cryptographic system to which the embodiment is applied.

FIG. 13 is a diagram describing an example of a method of providing a cipher text in such an application. In FIG. 13, a contents providing server 1301 for providing a cipher text (digital contents) corresponds to the sender terminal 10 and the recipient terminal 20. A terminal device 1302 of a user of the cipher text corresponds to the agent terminal 30. The delegation key del_key including information of the electronic signature set as the restricted condition is passed to the terminal device 1302 together with the cipher text or separately. Accordingly, as described above, only the terminal device 1302 having the electronic signature can be supported by the conversion server 40 to decrypt the cipher text.

As described above, according to the present invention, a cryptographic communication can be realized that is easy to delegate the decryption power of the cipher text under a certain restriction. Moreover, according to the present invention, a cryptographic communication system can be provided that implements a flexible security service using the aforementioned cryptographic communication. Although the preferred embodiment of the invention has been described in detail, it should be understood that various changes, substitutions and alternations can be made therein without departing from spirit and scope of the inventions as defined by the appended claims.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:
1. A terminal device, comprising:
delegation key holding means for holding a delegation key generated using a one-way hash function based on a public key of a predetermined conversion server, a predetermined restricted condition, and a secret key for decryption of an encrypted message, the delegation key allowing decryption of the message under the restricted condition;
inquiry means for transmitting at least part of the delegation key to the conversion server and receiving from the conversion server a parameter obtained as a result of validation of the conversion server according to the restricted condition; and decryption means for decrypting the message by use of the parameter acquired from the conversion server and the delegation key.

2. The terminal device according to claim 1, wherein
the delegation key held by said delegation key holding means is generated based on public keys of a plurality of conversion servers; and said inquiry means transmits/receives information to/from the plurality of conversion servers corresponding to the public keys.

3. A server, comprising:

receiving means for receiving from a predetermined terminal device a predetermined restricted condition, part of a message encrypted with a first public key, and predetermined information encrypted with a second public key;

judgment means for judging whether or not the acquired restricted condition is satisfied;

parameter calculation means for decrypting the predetermined information with a secret key corresponding to the second public key and calculating a parameter for decryption of the message by use of the predetermined information, the restricted condition, and the part of the message encrypted with the first public key; and transmitting means for transmitting to the predetermined terminal device the parameter calculated by said parameter calculation means.

4. The server according to claim 3, wherein said parameter calculation means calculates the parameter using a one-way hash function.

5. A program embodied in non-transitory computer readable storage medium for controlling a computer to decrypt an encrypted message, the program causing the computer to realize:

a function of holding in a predetermined storage a delegation key generated using a one-way hash function based on a public key of a predetermined conversion server, a predetermined restricted condition, and a secret key for decryption of an encrypted message, the delegation key allowing decryption of the message under the restricted condition;

a function of transmitting at least part of the delegation key to the conversion server and receiving from the conversion server a parameter obtained as a result of validation of the conversion server according to the restricted condition; and a function of decrypting the message using the parameter acquired from the conversion server and the delegation key.

6. A program embodied in non-transitory computer readable storage medium for controlling a computer to decrypt an encrypted message, the program causing the computer to realize:

a function of receiving from a predetermined terminal device a predetermined restricted condition, part of a message encrypted with a first public key, and predetermined information encrypted with a second public key;

a function of judging whether or not the acquired restricted condition is satisfied;

a function of decrypting the predetermined information with a secret key corresponding to the second public key and calculating a parameter for decryption of the message by use of the predetermined information, the restricted condition, and the part of the message encrypted with the first public key; and a function of returning the parameter to the predetermined terminal device.

7. A computer implemented decryption method, comprising the steps of:

generating a delegation key based on a first secret key corresponding to a first public key, a predetermined restricted condition, and a second public key, the delegation key allowing decryption of the message under the restricted condition;

passing at least part of the delegation key to an external party having a second secret key corresponding to the second public key and acquiring from the external party a result of judgment whether or not decryption processing with the delegation key satisfies the restricted condition; and decrypting the message, which is encrypted with the first public key, by use of the delegation key and the result of judgment of the external party.

8. An article of manufacture comprising a non-transitory computer usable storage medium having computer readable program code means embodied therein for causing decryption, the computer readable program code means in said article of manufacture comprising computer readable program code means for causing a computer to effect the steps of claim 7.

9. A non-transitory program storage device readable by machine, tangibly embodying a program of instructions executable by the machine to perform method steps for decryption, said method steps comprising the steps of claim 7.

10. A computer program product comprising a non-transitory computer usable storage medium having computer readable program code means embodied therein for causing decryption of an encrypted message, the computer readable program code means in said computer program product comprising computer readable program code means for causing a computer to effect the functions of claim 1.

11. A computer program product comprising a non-transitory computer usable storage medium having computer readable program code means embodied therein for causing server functions, the computer readable program code means in said computer program product comprising computer readable program code means for causing a computer to effect the functions of claim 3.

* * * * *